(12) United States Patent
Roch

(10) Patent No.: US 10,382,820 B2
(45) Date of Patent: Aug. 13, 2019

(54) APPARATUS AND METHOD FOR BANDWIDTH ALLOCATION AS A FUNCTION OF A SENSED CHARACTERISTIC OF A USER

(71) Applicant: Evelyne Roch, Gatineau (CA)

(72) Inventor: Evelyne Roch, Gatineau (CA)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 15/088,428

(22) Filed: Apr. 1, 2016

(65) Prior Publication Data
US 2017/0289622 A1    Oct. 5, 2017

(51) Int. Cl.
| | |
|---|---|
| *H04N 21/45* | (2011.01) |
| *H04N 21/442* | (2011.01) |
| *H04N 21/643* | (2011.01) |
| *H04N 21/462* | (2011.01) |
| *H04L 29/06* | (2006.01) |
| *H04N 21/647* | (2011.01) |
| *H04N 21/845* | (2011.01) |

(52) U.S. Cl.
CPC ..... *H04N 21/4532* (2013.01); *H04L 65/4084* (2013.01); *H04L 65/80* (2013.01); *H04N 21/44218* (2013.01); *H04N 21/44227* (2013.01); *H04N 21/4621* (2013.01); *H04N 21/64322* (2013.01); *H04N 21/64738* (2013.01); *H04N 21/8456* (2013.01)

(58) Field of Classification Search
CPC ......... H04N 21/42201; H04N 21/2402; H04N 21/44209; H04N 21/26216; H04N 21/2385; H04N 21/44218; H04N 21/44227; H04N 21/4532; H04N 21/23655; H04L 41/0896; H04L 47/70
USPC .................................................. 725/9–12, 34
See application file for complete search history.

(56) References Cited

U.S. PATENT DOCUMENTS

| | | | |
|---|---|---|---|
| 8,004,391 B2* | 8/2011 | Cruz Hernandez | ......................... A61B 5/02438 340/407.1 |
| 8,327,395 B2* | 12/2012 | Lee | ....................... G06Q 30/02 725/10 |

(Continued)

FOREIGN PATENT DOCUMENTS

| | | |
|---|---|---|
| WO | 2011047335 A1 | 4/2011 |
| WO | 2013109941 A2 | 7/2013 |

*Primary Examiner* — Nathan J Flynn
*Assistant Examiner* — Cynthia M Fogg

(57) ABSTRACT

Provided is an apparatus and method for adjusting a bandwidth allocation for a traffic flow associated with a user as a function of a sensed characteristic of the user. A communication device has a sensor data receiver for receiving sensor data pertaining to a sensed characteristic of a user, and circuitry implementing an IRSCU (information representative of the sensed characteristic of the user) messenger configured for sending, to a network entity used for adjusting a bandwidth allocation for a traffic flow associated with the user, a message containing IRSCU. A network management entity, which receives the IRSCU, has circuitry implementing a bandwidth adjustor, which is configured for adjusting, based on the IRSCU, a bandwidth allocation for a traffic flow associated with the user. Accordingly, the bandwidth allocation for the traffic flow associated with the user is adjusted as a function of the sensed characteristic of the user.

23 Claims, 8 Drawing Sheets

(56) References Cited

U.S. PATENT DOCUMENTS

| | | | |
|---|---|---|---|
| 9,292,858 B2* | 3/2016 | Marci | A61B 5/16 |
| 9,521,960 B2* | 12/2016 | Lee | A61B 5/0205 |
| 2003/0052911 A1 | 3/2003 | Cohen-Solal | |
| 2005/0120305 A1* | 6/2005 | Engstrom | G06Q 30/02 |
| | | | 715/760 |
| 2005/0223237 A1* | 10/2005 | Barletta | G06F 3/011 |
| | | | 713/186 |
| 2006/0222110 A1* | 10/2006 | Kuhtz | H04H 20/42 |
| | | | 375/334 |
| 2007/0091920 A1 | 4/2007 | Harris et al. | |
| 2008/0259841 A1* | 10/2008 | Deshpande | H04L 45/245 |
| | | | 370/328 |
| 2008/0295126 A1* | 11/2008 | Lee | G06Q 30/02 |
| | | | 725/10 |
| 2010/0100914 A1* | 4/2010 | Sugiyama | H04L 65/4069 |
| | | | 725/109 |
| 2015/0067708 A1* | 3/2015 | Jensen | H04N 21/4756 |
| | | | 725/10 |
| 2015/0341411 A1* | 11/2015 | Huber | H04L 65/4092 |
| | | | 709/231 |
| 2016/0080448 A1* | 3/2016 | Spears | H04L 65/602 |
| | | | 709/219 |

* cited by examiner

APPARATUS AND METHOD FOR BANDWIDTH ALLOCATION AS A FUNCTION OF A SENSED CHARACTERISTIC OF A USER

FIELD OF THE INVENTION

This application relates to communication systems, and more particularly to bandwidth allocation.

BACKGROUND

A user may have one or more communication devices such as a mobile device, a set top box, or a PC (Personal Computer) for example. Such communication devices are capable of communicating with a network for downloading and/or uploading content for various purposes.

Some video content providers such as Netflix™ recognise that streaming video content can consume a significant amount of bandwidth. Thus, periodically the streaming of the video content may be paused and the user prompted to indicate an interest in continuing the streaming session. Without receipt of an indication of interest from the user, the streaming session is terminated.

SUMMARY OF THE INVENTION

Prompting a user if they are still watching streaming video content can be disruptive for the user. Disabling this feature is possible, but this may lead to situations in which bandwidth is wasted. For instance, if the user has fallen asleep or is otherwise not paying attention, and the streaming of the video content continues bandwidth will be consumed to stream video content that is not viewed. Thus, consumption of bandwidth provides no benefit to the content supplier or consumer, and in the context of a network with high usage, is a sub-optimal use of constrained resources.

In conventional traffic engineering approaches the status or state of a connected device may be considered in both determining flow routing and in bandwidth allocation processes. A state, or status, of the user, as opposed to the UE (User Equipment), has not been used as an input to traffic engineering decisions. The state or status of a user can be considered indicative of a user demand and may affect the perceived QoE (Quality of Experience). For example, if a user has fallen asleep while watching video content, the bandwidth allocated to the video stream can be reduced without negatively impacting the perceived QoE level. The status or state of a user may also provide an indication that a user is anxiously waiting for a data transfer to finish; the location data associated with the user may indicate that the user is at an airport. Along with other information, the user state and location may indicate that the user is boarding an airplane. This information could be used to adjust bandwidth allocation to the user.

According to an aspect of the invention, there is provided an apparatus and method for adjusting a bandwidth allocation for a traffic flow associated with a user as a function of a sensed characteristic. The sensed characteristic may be based on sensor data. In some implementations, bandwidth is prioritized in a manner that may enhance the user's QoE based on the sensed characteristic of the user.

A communication device provided by an embodiment of the invention has a network interface configured to communicate with a network, and a sensor data receiver for receiving sensor data pertaining to a sensed characteristic of a user. In some implementations; the sensor data is received from a peripheral sensor and includes user heartrate data, although other sensor data is possible. The communication device has circuitry implementing an IRSCU (information representative of the sensed characteristic of the user) messenger configured for sending, to a network entity used for adjusting a bandwidth allocation for a traffic flow associated with the user, a message containing IRSCU.

In some implementations, the network entity to which the IRSCU is sent is a network management entity such as a TE (Traffic Engineering) controller. In other implementations, the network entity to which the IRSCU is sent is a database that is accessible by a network management entity for use in traffic management.

A network management entity provided by an embodiment of the invention has an interface configured to receive a message containing IRSCU. The network management entity also has circuitry implementing a bandwidth adjustor configured for adjusting, based on the IRSCU, a bandwidth allocation for a traffic flow associated with the user. Accordingly, the bandwidth allocation for the traffic flow associated with the user is adjusted as a function of the sensed characteristic of the user.

Other aspects and features of the present invention will become apparent, to those ordinarily skilled in the art, upon review of the following description of the various embodiments of the invention.

BRIEF DESCRIPTION OF THE DRAWINGS

Embodiments will now be described by way of example with reference to the attached drawings in which.

DETAILED DESCRIPTION OF EMBODIMENTS

It should be understood at the outset that although illustrative implementations of one or more embodiments of the present invention are provided below, the disclosed systems and/or methods may be implemented using any number of techniques. The invention is not limited to the illustrative implementations, drawings, and techniques illustrated below, including the designs and implementations illustrated and described herein, but may be modified within the scope of the appended claims along with their full scope of equivalents.

Apparatus for Traffic Allocation

Figure 1:
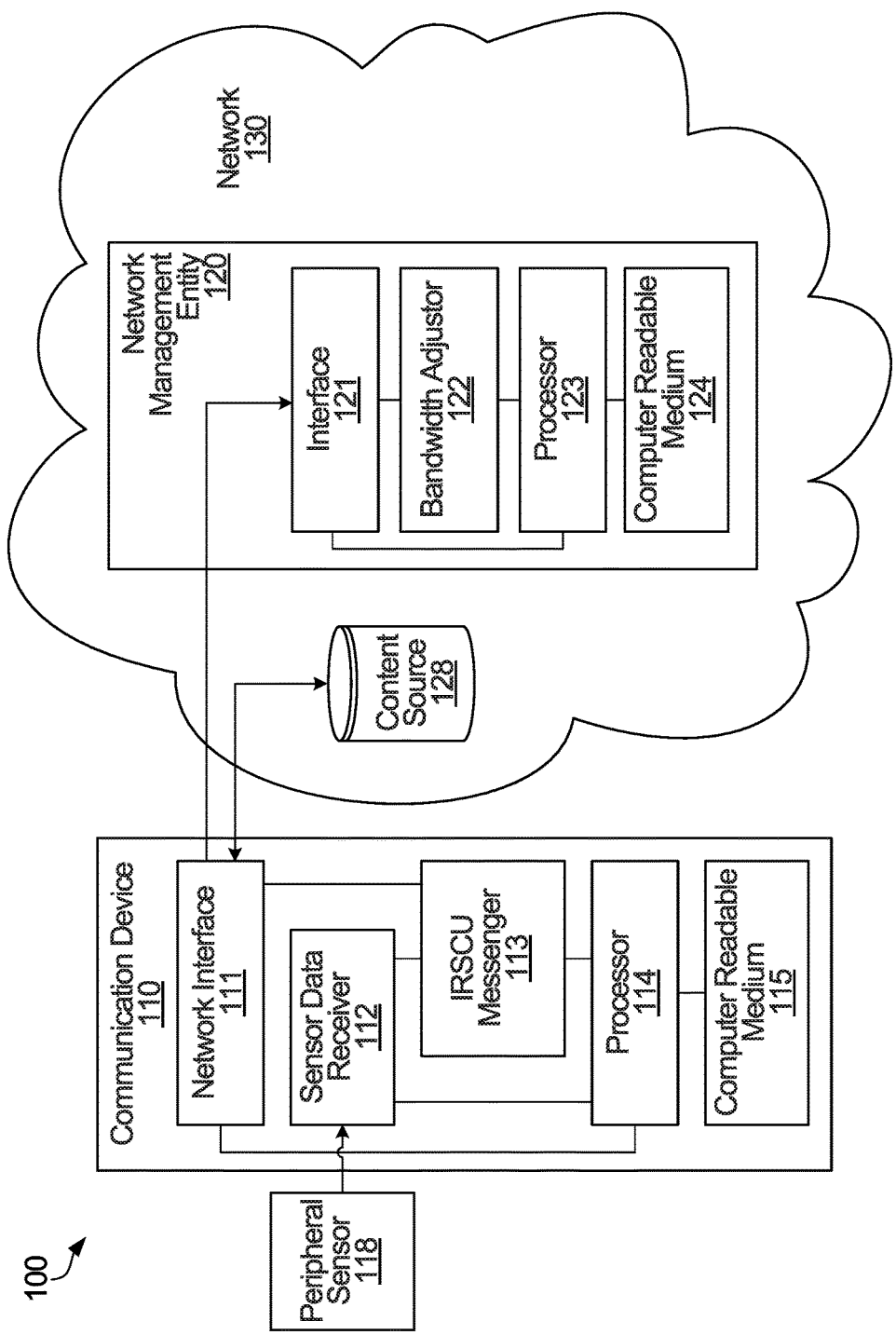
FIG. 1 is a block diagram of an example communication system having a communication device and a network management entity of a network, in accordance with an embodiment of the invention.

FIG. 1 is a block diagram of an example communication system 100 having a communication device 110 and a network management entity 120 of a network 130, in accordance with an embodiment of the invention. The communication system 100 may have several communication devices, but only one communication device 110 is shown for simplicity. Also, the network 130 may have other components than those shown, but they have been omitted for simplicity.

The communication device 110 has a network interface 111 configured to communicate with the network 130, a sensor data receiver 112 for receiving sensor data pertaining to a sensed characteristic of a user from a peripheral sensor 118, circuitry implementing an IRSCU (information representative of the sensed characteristic of the user) messenger 113, a processor 114, a non-transitory computer readable medium 115, and may have other components that are not specifically shown. Although the components are shown to be separate components, some components can be combined. In some implementations, the communication device 110 is a UE such as a smartphone, a tablet/laptop/desktop computer, or a set top box for example. The communication device 110 can be mobile or fixed. Those skilled in the art will appreciate that, in some embodiments, elements such as the IRSCU messenger 113 may be implemented as a logical function provided by processor 114.

The network management entity 120 has an interface 121, circuitry implementing a bandwidth adjustor 122, a processor 123, a non-transitory computer readable medium 124, and may have other components that are not specifically shown. In some implementations, the network management entity 120 is a TE (Traffic Engineering) controller, which is a network function in a control plane (not shown) that operates to manage traffic in a data plane (not shown). Such traffic may, for example, include streaming video content to the communication device 110 from a content source 128. The content source 128 will be understood as a service that provides streaming video content to users. Those skilled in the art will appreciate that, in some embodiments, elements such as the bandwidth adjustor 112 may be implemented as a logical function provided by processor 123.

Operation of the communication system 100 will now be described by way of example. The communication device 110 receives sensor data pertaining to a sensed characteristic of the user. In some implementations, the sensor data includes user heartrate data, although other sensor data is possible as will be described below. The circuitry implementing the IRSCU messenger 113 sends, to a network entity via the network interface 111, a message containing IRSCU. The IRSCU includes any appropriate information that is representative of the sensed characteristic of the user. For example, the IRSCU can include at least some of the sensor data and/or at least some processed data that is based on the sensor data.

In the illustrated embodiment, the network entity to which the message is sent is the network management entity 120. In another embodiment, the network entity to which the message is sent is a database (not shown) that is accessible by the network management entity 120 for use in traffic management. More generally, the network entity to which the message is sent can be any network entity used for adjusting a bandwidth allocation for a traffic flow associated with the user.

In some implementations, the circuitry implementing the IRSCU messenger 113 generates the message with a header containing information for use in routing the message to the network entity. In specific implementations, the header includes an IP (Internet Protocol) address of the network entity to which the message is to be sent.

The network management entity 120 receives a message containing IRSCU via the interface 121. In the illustrated embodiment, the network management entity 120 receives the IRSCU from the communication device 110. However, as noted above, in another embodiment, the network management entity 120 retrieves the IRSCU from an accessible database (not shown). In general, there are many ways for the network management entity 120 to receive the IRSCU.

The circuitry implementing the bandwidth adjustor 122 adjusts, in accordance with the received (or retrieved) IRSCU, a bandwidth allocation for a traffic flow that is associated with the user. For example, in some implementations, the circuitry implementing the bandwidth adjustor 122 makes use of control plane functionality to adjust the data plane bandwidth for links between the communication device 110 and the content source 128. In some embodiments, a single link (such as the link that terminates with the communication device 110) is the only link whose bandwidth is adjusted. By adjusting the bandwidth in this link, conventional traffic flow control methods will propagate information back to the content source 128 which will result in the content source adjusting the rate at which data is transmitted. In general, the bandwidth allocation for a traffic flow associated with the user is adjusted as a function of the sensed characteristic of the user. The bandwidth allocation for the traffic flow can be adjusted individually, or collectively with other traffic flows as will be described in further detail below.

There are many ways in which the bandwidth allocation can be adjusted based on the IRSCU. In a specific example, the IRSCU may be indicative of the user being stressed (e.g. the user is frustrated or is in mild distress) while there is a download in progress from the content source 128 to the communication device 110. If this condition is also matched by a user location (e.g. an airport) that indicates that there may be a time limit after which the user will no longer have connectivity, the network management entity 120 may adjust the resources allocated to the download. The bandwidth allocation can be increased. Increasing the bandwidth allocated to a data transfer may improve the user experience, and thus the user's perception of the QoE. In other situations, the IRSCU may indicate that the user has likely fallen asleep. This may have occurred, for example, while the user is watching video content. In this situation, the network management entity 120 can identify the streams associated with the user and instruct a reduction in the bandwidth allocation. This bandwidth adjustment is carried out at the network layer, and not through an application layer process directly associated with the delivery of content. Many video streaming services make use of adaptive bit rate technologies which will result in the content source reducing a bit rate of the video content in response to the reduced bandwidth allocation. The reduced bit rate may result in a decrease in video quality, but if the user is asleep there will be no decrease in the perceived QoE. Some implementations of the invention set out to save bandwidth when such savings are not likely to upset end users.

Although the bandwidth allocation for a traffic flow associated with the user is determined in accordance with the IRSCU, in some implementations, such determination is also based on other factors such as network issues, network load, contracted QoS (Quality of Service) guarantees, etc. Other factors such as the user's location can also be used as an input to the process to determine an adjustment of the bandwidth allocation. For example, if the user is at an airport and is about to board an airplane in which the user may no longer have network access, then bandwidth allocation can be increased to allow any ongoing data transfers to complete. The IRSCU is not necessarily the only factor in determining the bandwidth allocation for a traffic flow associated with the user.

In some situations, the IRSCU is sent to the network 130 as a form of feedback. This feedback can provide an indication about how a QoS relates to the perceived QoE. For example, if a QoS is being met, but the IRSCU indicates that the user is still stressed, the QoE may still be adversely impacted. Adjusting parameters of a data flow associated with the user may result in an improved QoE. Similarly, an IRSCU representative of a very relaxed user, or a user that is sleeping, may indicate that the QoS and QoE are completely decoupled. In such circumstances the QoS levels can be reduced without adverse impact on the perceived QoE.

In some implementations, as shown in the illustrated example, the communication system 100 has one communication device 110 associated with the user. However, in other implementations, the communication system 100 has several communication devices associated with the user, and at least one of these communication devices is configured in a similar manner as the communication device 110 shown in FIG. 1. At least one of the communication devices send messages containing IRSCU to the network management entity 120. Different communication devices may transmit messages containing IRSCU based on different characteristics. In some implementations, the network management entity 120 uses an aggregation of the IRSCU received from more than one communication device to determine a bandwidth allocation associated with the user, which can include a respective allocation for traffic flows destined to different devices. Thus, the IRSCU of the user conveyed by a first communication device may affect the user's communications involving the first communication device and/or a second communication device. Note that the first communication device does not need to be receiving and/or transmitting data (other than the IRSCU), but the IRSCU provided by the first communication device can be used to allocate bandwidth for traffic involving the second communication device. A detailed example involving multiple communication devices for a user is described later with reference to FIG. 4.

The peripheral sensor 118 is shown to be external to the communication device 110. In some implementations, the peripheral sensor 118 is worn by the user. In other implementations, the peripheral sensor 118 is not worn by the user. In some implementations, the communication device 110 receives the sensor data from the peripheral sensor 118 through any appropriate externally wired or wireless connection. Examples include a USB (Universal Serial Bus) connection, a Bluetooth connection, and a Wi-Fi connection. However, in other implementations, the communication device 110 includes an integrated sensor (not shown) from which it receives sensor data associated with the user.

In some implementations, the communication device 110 is configured to receive information from different types of sensors. Although sensor data is received from one peripheral sensor 118 in the illustrated example of FIG. 1, in other embodiments, sensor data can be received from several peripheral sensors. In one example, brainwave data is received from a brainwave sensor, and user heartrate data is received from a heartrate sensor. A combination of different peripheral sensors may be able to provide data indicative of some combination of two or more of heartrate, body temperature, respiratory rate, muscle tension, brainwave measurements, galvanic skin response (also referred to as skin conductance levels) and so forth. A combination of different peripheral sensors can provide more sensor data, which may allow for more accurate and complete information of the user's state. The more complete that the picture of the user's state is, the more useful the IRSCU can be in determining how to allocate bandwidth for the user. In other implementations, the communication device 110 is configured to accommodate a connection to only one type of sensor. It should also be understood that although, as illustrated, each sensor provides a single type of data, a single device may have different sensors, and an aggregation of the readings from the different sensors can be sent to the communication device 110.

The communication device 110 is configured to transmit the IRSCU to network entities. In one example implementation, the IRSCU is sent to a specified network entity. The address of the specified network entity can be configured manually or automatically. In some implementations, the specified network entity is the network management entity 120. In other implementations, the specified network entity is a database (now shown) that is accessible by the network management entity 120 for use in traffic management. In some implementations, the peripheral sensor 118 uses the communication device 110 as a relay to allow sensor data to be transmitted to the database for use by the network management entity 120. Alternatively, the communication device 110 may perform various processing such as aggregating data from a plurality of sensors, and/or generating and sending messages containing IRSCU. There are a number of different database techniques that can be used to allow the extraction of the IRSCU from the database. In some implementations, the IRSCU is extracted from the database when and if certain data exceeds a given threshold, for example when and if heart rate data exceeds a heart rate threshold. In some implementations, the threshold is predefined. In other implementations, the threshold is based on user-specific data and is determined based on IRSCU that the user has previously shared. For example, if a user normally has a high heart rate relative to most people, then the heart rate threshold for the user can be set higher than the heart rate threshold for other users.

There are many possible implementations for the circuitry implementing the IRSCU messenger 113 of the communication device 110. In some implementations, the circuitry implementing the IRSCU messenger 113 includes the processor 114, which is configured to implement the IRSCU messenger 113 when instructions recorded on the computer-readable medium 115 are executed by the processor 114. In other implementations, the circuitry implementing the IRSCU messenger 113 includes any one or combination of dedicated devices such as a DSP (Digital Signal Processor), an FPGA (Field Programmable Gate Array), an ASIC (Application Specific Integrated Circuit) or a microcontroller. Similarly, the bandwidth adjustor 122 can, in some implementations, be implemented by the execution of instructions recorded in the computer-readable medium 124 by the processor 123, or through similarly dedicated devices. More generally, the circuitry implementing the IRSCU messenger 113 and the bandwidth adjustor 122 includes any appropriate combination of hardware, and/or software and/or firmware.

Further example details of adjusting a bandwidth allocation for a user as a function of a sensed characteristic of the user are provided below with reference to FIGS. 2 through 5.

Example Methods

Figure 2A:
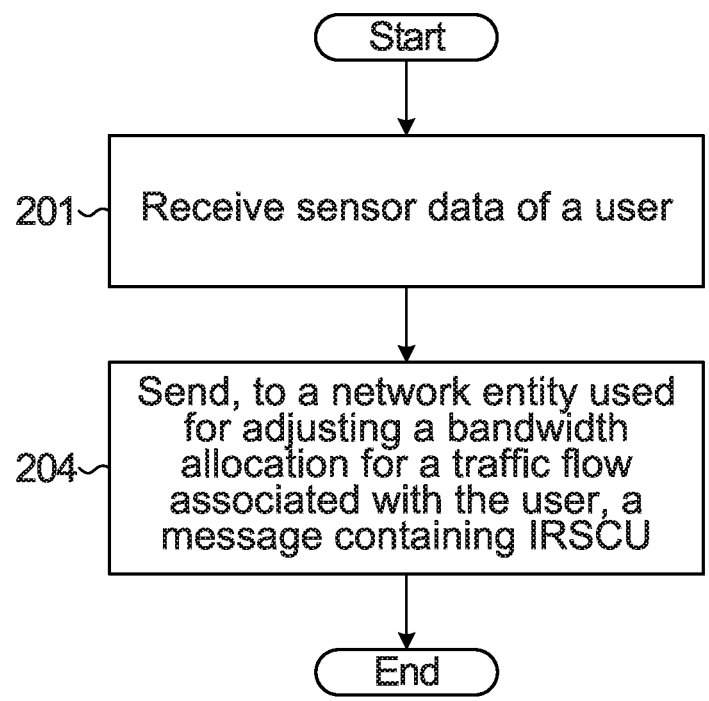
FIGS. 2A and 2B are flow charts of example methods for conveying a sensed characteristic of a user to a network entity, in accordance with an embodiment of the invention.

FIG. 2A is a flow chart of an example method for conveying a sensed characteristic of a user to a network entity. This method may be implemented by a communication device, for example the communication device 110 shown in FIG. 1.

At step 201, the communication device receives sensor data pertaining to a sensed characteristic of a user. As described above, in some implementations, the sensor data includes user heartrate data, although other sensor data is possible. Details of sensor data that may be received by the communication device have been provided above and are not repeated here.

At step 204, the communication device sends the IRSCU to a network entity that participates in the determination of the adjustment of a bandwidth allocation for a traffic flow associated with the user. The IRSCU includes any appropriate information that is representative of the sensed characteristic of the user. In some implementations, the IRSCU includes at least some of the sensor data. In some implementations, the IRSCU includes processed data that is based on the sensor data. In such implementations, the sensor data is processed prior to transmission. An example of this is described below with reference to FIG. 2B. It will also be understood that sending the IRSCU to the network entity may include sending the IRSCU to a database that is accessed by the network entity when adjustments to bandwidth allocations are made.

Figure 2B:
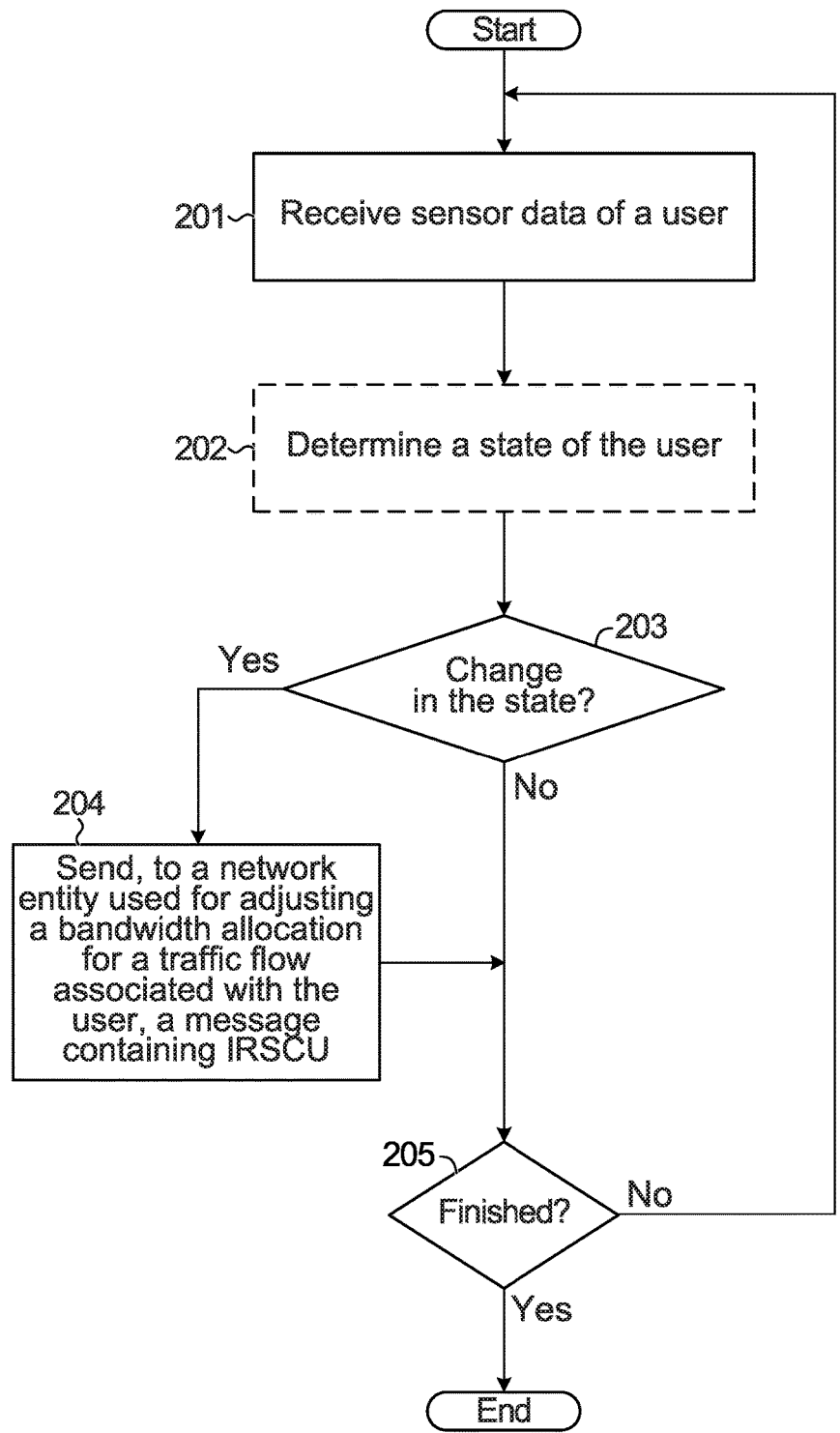

FIG. 2B is a flow chart of another example method for conveying a sensed characteristic of a user to a network entity, in accordance with an embodiment of the invention. This method may be implemented by a communication device, for example the communication device 110 shown in FIG. 1.

At step 201, the communication device receives sensor data pertaining to a sensed characteristic of a user as similarly described above for FIG. 2A. In some implementations, as shown in step 202, the communication device determines a state of the user based on the sensor data. For example, the communication device may determine that the user is frustrated or is in distress if the sensor data includes user heartrate data that indicates an elevated heart rate and certain changes in the galvanic skin response. As another example, the communication device may user various sensor data to determine that the user is asleep. In other implementations, the communication device does not determine a state of the user in which case the communication device might not analyse the sensor data at all. In this case, step 202 can be omitted.

In some implementations, the communication device categorises the user into one of many possible states based on the sensor data. There are many possibilities for the states. In some implementations, the states include:
state 1: frustrated, distressed or stressed,
state 2: actively engaged,
state 3: awake but relaxed or bored, and
state 4: asleep or not alert.
Other states may be defined in an implementation-specific manner.

The manner in which the communication device categorises the user into one of the states may depend on the type of sensor data that is received. For example, the user may be categorised into state 1 listed above if there is sensor data from a heartrate sensor indicating a high pulse rate, or sensor data from a blood pressure sensor indicating high blood pressure. As another example, the user may be categorised into state 4 listed above if there is sensor data from a heartrate sensor indicating a resting heart rate.

At step 203, the communication device determines whether there has been a change in the state of the user. Such change can include the user falling asleep or becoming frustrated for example. If there has been a change in the state of the user, then at step 204 the communication device sends, to a network entity used for adjusting a bandwidth allocation for a traffic flow associated with the user, a message containing IRSCU. As previously described with reference to FIG. 1, in some implementations, the network entity to which the message is sent is a network management entity such as a TE controller, and in other implementations, the network entity to which the message is sent is a database that is accessible by a network management entity for use in traffic management.

In other implementations, the communication device sends the message at step 204 even if there has been no change in the state of the user in which case steps 202 and 203 can be omitted. In such an implementation, step 201 is immediately followed by step 204 as shown in FIG. 2A. For example, in some implementations, the communication device sends a message containing IRSCU on a periodic basis regardless of whether the state of the user has changed. In some implementations, the communication device sends a message containing IRSCU based on certain criteria being met, such as upon start-up or initialization of the communication device. Other criteria can include a measured characteristic exceeding a threshold, or changing by a predefined amount.

There are many content possibilities for the message containing IRSCU. In some implementations, the message includes at least some of the sensor data as received at step 203. In some implementations, the message includes the sensor data by itself without any processing or supplemental information. In other words, the message merely forwards raw sensor data. In other implementations, the message includes processed information such as an indication of the state of the user as determined at step 202. In further implementations, the message includes at least some of the sensor data as received at step 201, and processed information such as an indication of the state of the user as determined at step 202. Other implementations are possible.

At step 205, the communication device determines whether to continue to cycle through steps 201 through 204. In some implementations, the communication device cycles through steps 201 through 204 until some condition is met, such as the communication device receiving an indication from the network that the IRSCU is no longer required or the user intervening to cancel the method for example. Meanwhile, several messages may be sent at step 204, which may serve as update messages reflecting changes in the state of the user. If at step 205 the communication device determines that steps 201 through 204 are no longer to be repeated, then the method ends. In some embodiments, the determination to finish the process in step 205 is made in accordance with the number of traffic flows associated with the user that remain in the network, and the available bandwidth in the segments of the network used by the traffic flows.

Figure 3:
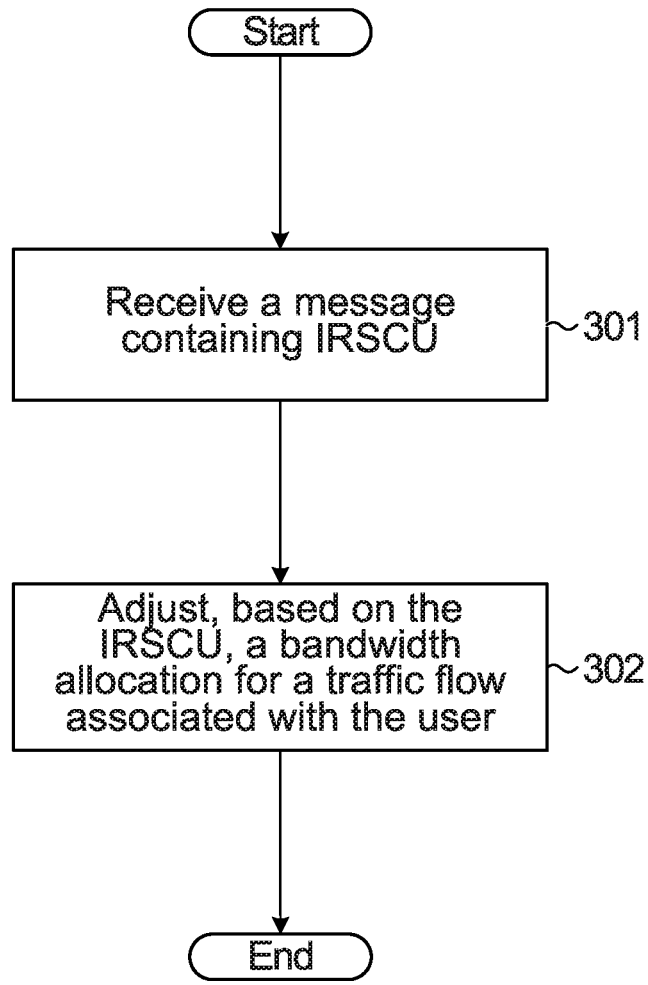
FIG. 3 is a flow chart of an example method for adjusting a bandwidth allocation for a traffic flow associated with a user as a function of a sensed characteristic of the user, in accordance with an embodiment of the invention.

FIG. 3 is a flow chart of an example method for adjusting bandwidth allocation for a traffic flow associated with a user as a function of a sensed characteristic of the user, in accordance with an embodiment of the invention. This method may be implemented by a network management entity, for example the network management entity 120 shown in FIG. 1.

At step 301 the network management entity receives a message containing IRSCU. As previously described with reference to FIG. 1, in some implementations, the IRSCU is received from a communication device of the user, and in other implementations, the IRSCU is received from a database in response to a query. As also previously described, in some implementations, the IRSCU includes sensor data and/or processed data such as an indication of a state of the user. Details of the IRSCU have been provided above and are not repeated here.

At step 302 the network management entity adjusts, based on the IRSCU, a bandwidth allocation for a traffic flow associated with the user. Accordingly, the bandwidth allocation for the traffic flow associated with the user is adjusted as a function of the sensed characteristic of the user. As previously noted for FIG. 1, in some implementations, such adjustment is also based on other factors. The adjustment of the bandwidth allocation may affect the user's communications involving one or more communication devices.

There are many ways in which bandwidth allocation can be adjusted based on the IRSCU. The network management entity can map the IRSCU to a decision on whether and how to adjust the bandwidth allocation. The adjustment can be an increase or a decrease in bandwidth allocation. In some embodiments, this increase or decrease will be subject to a certain maximum or minimum.

In some implementations, the network management entity determines in accordance with the IRSCU whether the allocated bandwidth should be increased or decreased. In some implementations, the network management entity considers user-specific information when making these determinations. User-specific information, such as whether the user normally has a high heart rate relative to most people, can be useful in determining whether the user is actually upset or not. Further details of how bandwidth allocation can be adjusted are described later in connection with FIGS. 4 and 5.

Computer Readable Medium

In accordance with another embodiment of the disclosure, there is provided a non-transitory computer readable medium having recorded thereon statements and instructions that, when executed by a processor of a communication device, implement the method described above for FIG. 2A or FIG. 2B.

In accordance with another embodiment of the disclosure, there is provided a non-transitory computer readable medium having recorded thereon statements and instructions that, when executed by a processor of a network management entity, implement the method described above for FIG. 3.

There are many possibilities for the non-transitory computer readable medium. In some implementations, the non-transitory computer readable medium is an optical disk such as a CD (Compact Disk), a DVD (Digital Video Disk), or a BD (Blu-Ray Disk). Alternatively, in other implementations, the non-transitory computer readable medium is any one of a memory stick, a memory card, a disk drive, a solid state drive, etc.

Other non-transitory computer readable media are possible and are within the scope of this disclosure. More generally, the non-transitory computer readable medium can be any tangible medium (i.e. non-transitory) in which the computer executable instructions can be stored.

Other Communication Systems

Figure 4:
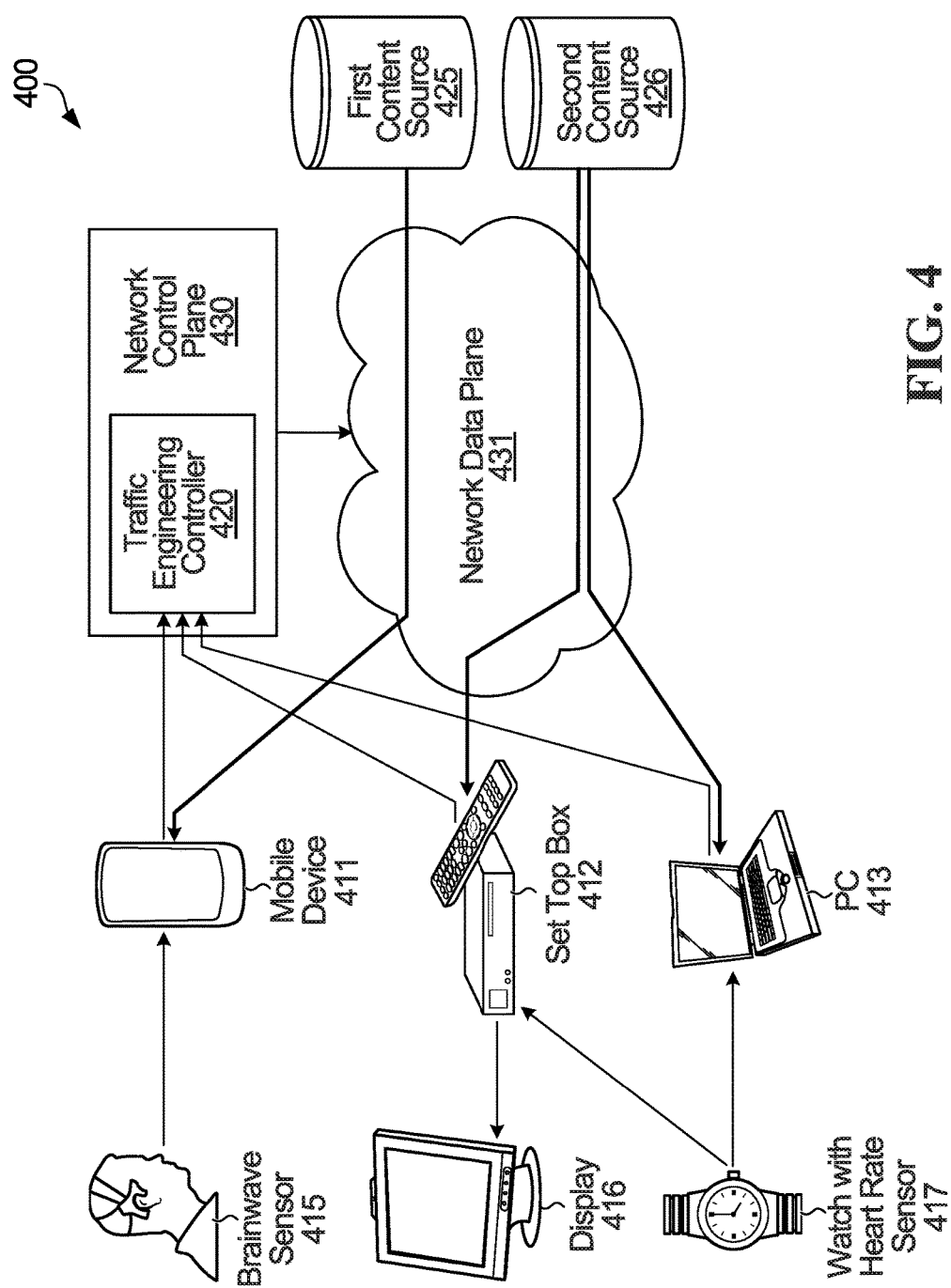
FIG. 4 is a block diagram of an example communication system having multiple communication devices for a user, in accordance with an embodiment of the invention.

FIG. 4 is a block diagram of an example communication system 400 having multiple communication devices 411, 412, 413 for a user, in accordance with an embodiment of the invention. It is to be understood that the communication system 400 is shown with specific components in a specific arrangement for exemplary purposes only. Other components and arrangements are possible and are within the scope of the invention.

The communication devices 411, 412, 413 belonging to the user include a mobile device 411, a set top box 412 with a display 416, and a PC 413. The communication system 400 may have other communication devices for other users, but they are not shown for sake of simplicity. In some implementations, each communication device 411, 412, 413 has a configuration similar to the communication device 110 shown in FIG. 1. However, other configurations are possible and are within the scope of the invention. Each communication device 411, 412, 413 is coupled to one or more peripheral sensors 415, 417 including a brainwave sensor 415, and a watch having a heartrate sensor 417. However, other peripheral sensors are possible and are within the scope of the invention.

The communication system 400 also has a network including a network control plane 430, which has a TE controller 420, and a network data plane 431, which provides data paths between the communication devices 411, 412, 413 and various content sources 425, 426. In some implementations, the network is a wireless network. In some implementations, the network is an SDN (Software-Defined Networking) network that employs ONF (Open Networking Foundation) OpenFlow to provide access to the network data plane 431. However, other networks are possible and are within the scope of the invention. In some implementations, the TE controller 420 has a configuration similar to the network management entity 120 shown in FIG. 1, but has been configured to receive IRSCU from several sources. In some implementations, the TE controller 420 forms part of a switch, a router, an optical cross-connect, a ROADM (Reconfigurable Optical Add-Drop Multiplexer), or converged packet-optical equipment. However, other TE controllers are possible and are within the scope of the invention.

Operation of the communication system 400 will now be described by way of example. In the illustrated example, the mobile device 411 downloads content from the first content source 425. The set top box 412 and the PC 413 both receive content from the second content source 426. However, other combinations of communication devices and content sources are possible and are within the scope of the invention. The communication devices 411, 412, 413 may interact with the content sources 425, 426 at the same time, or at different times.

Each communication device 411, 412, 413 receives sensor data representative of readings taken by sensors monitoring at least one aspect of the user. In the illustrated example, the mobile device 411 receives brainwave data from the brainwave sensor 415. Also, the set top box 412 and the PC 413 both receive user heartrate data from the watch having the heartrate sensor 417. However, other combinations of communication devices receiving sensor data from other combinations of peripheral sensors are possible and are within the scope of the invention.

Each communication device 411, 412, 413 sends, to the TE controller 420, a message containing IRSCU based on the sensor data that it receives. Note that the communication devices may convey different IRSCU, as the communication devices 411, 412, 413 do not all receive the same sensor data. The TE controller 420 receives the messages. The TE controller 420 determines, based on the IRSCU conveyed by the communication devices 411, 412, 413, a bandwidth allocation for a traffic flow associated with the user. In some implementations, the TE controller 420 independently adjusts a bandwidth allocation for each traffic flow associated with the user. For example, the TE controller 420 can adjust the bandwidth allocation of the traffic flow to the set top box 412, but leave the traffic flow to the PC 413 untouched.

In some implementations, the bandwidth allocation is part of a traffic policy that specifies bandwidth for one or more traffic flows associated with the user, such as traffic flows for streaming video content, streaming music content, streaming online game data, downloading or uploading data files, etc. In some implementations, the traffic policy is determined based on a combination of the IRSCU conveyed by the communication devices 411, 412, 413. Thus, IRSCU conveyed by one communication device of the user may affect communications involving another communication device of the user.

A specific case scenario will now be described as an example. The user is at home in front of the display 416 and is wearing both the brainwave sensor 415 and the watch having the heartrate sensor 417. The user is doing work on the PC 413 while the PC 413 is receiving streaming music from the second content source 426 so that the user can listen to music while working. At the same time, the set top box 412 is receiving streaming video content for display by the display 416, but the user's attention is focused on the PC 413 because the user has important work to complete before soon leaving home to go to an airport to board an airplane for a business trip. The mobile device 411 is downloading data files from the first content source 425 so that they will be available without network access when the user later boards the airplane. The data files being downloaded are quite large with a total size of around 10 GB.

The PC 413 receives user heartrate data from the heartrate sensor 417. The user heartrate data suggests that the user is awake because the user's heart rate is too high for the user to be asleep. In some implementations, this determination is based on whether the user's heart rate is greater than a predefined threshold. In some implementations, the predefined threshold is set based on history information of the user's heart rate in the past. The IRSCU sent to the TE controller 420 from the PC 413 conveys that the user is awake. In response, the TE controller 420 allocates enough bandwidth for the streaming music to allow a relatively high audio bit rate. In some implementations, this is accomplished by rate control of a traffic flow for the streaming music resulting in a given bandwidth for the streaming music. In some implementations, a TCP (Transmission Control Protocol) flow adapts to the given bandwidth, and the second content source 426 accordingly adjusts the audio bit rate for the streaming music, for example by adjusting compression. The relatively high bit rate for the streaming music may allow for an acceptable QoE for the user.

The set top box 412 also receives the user heartrate data from the heartrate sensor 417. Again, the user heartrate data suggests that the user is awake. The IRSCU sent to the TE controller 420 from the set top box 412 conveys that the user is awake. In response, the TE controller 420 allocates enough bandwidth for the streaming video content to allow a moderate audio bit rate but a low video bit rate to conserve bandwidth. In some implementations, this is accomplished by rate control of a traffic flow for the streaming video content resulting in a given bandwidth for the streaming video content. In some implementations, a TOP flow adapts to the given bandwidth, and the second content source 426 accordingly adjusts the audio bit rate and the video bit rate, for example by adjusting compression. Because the user is not actually watching the streaming video content, the low video bit rate does not result in a poor QoE for the user. Meanwhile, bandwidth is saved.

The mobile device 411 receives brainwave data from the brainwave sensor 415. The brainwave data suggests that the user is awake due to presence of beta brainwaves having measurable frequencies in a range of 12 Hz to 38 Hz. The brainwave data does not include many high frequency brainwaves, which suggests that the user is not hyper-alert or agitated. The IRSCU sent to the TE controller 420 from the mobile device 411 conveys that the user is awake but calm. In response, the TE controller 420 allocates a moderate amount of bandwidth for transferring the data files. In some implementations, this is accomplished by rate control of a traffic flow for the data transfer resulting in a given bandwidth for transferring the data files. In some implementations, a TOP flow adapts to the given bandwidth.

At some point the user finishes the important work on the PC 413 and starts watching the streaming video content on the display 416. The traffic flows to the PC 413 are terminated by the user. The user notices poor video quality due to the low video bit rate and gets somewhat annoyed, which results in his heartrate increasing. Updated IRSCU sent to the TE controller 420 from the set top box 412 conveys that the user is awake and is somewhat annoyed. In response to the changed IRSCU and the lack of IRSCU from the PC 413, the TE controller 420 allocates an increased bandwidth for the streaming video content. In some implementations, this is accomplished by rate control of the traffic flow for the streaming video content resulting in a given bandwidth for the streaming video content. In some implementations, a TOP flow adapts to the given bandwidth, and the second content source 426 accordingly increases the audio bit rate and/or the video bit rate, for example by adjusting compression. Because the user is actually watching the streaming video content, the audio bit rate and/or the video bit rate being increased may allow for an acceptable QoE for the user, as the user may notice and appreciate the increase in quality.

After watching the video content for a few minutes, the user notices that it is time to leave home and go to the airport. The streaming session to the set top box 412 is terminated by the user. The user looks at the mobile device 411 and notices that the mobile device 411 has not finished downloading the data files. The user instantly becomes concerned, and this is picked up by the brainwave sensor 415, which is now providing brainwave data with high frequency brainwaves suggesting that the user is hyper-alert or agitated. The user's agitation is also picked up by the watch having the heartrate sensor 417, which is now providing user heartrate data with an elevated heart rate. Consequently, each communication device 411, 412, 413 receives sensor data indicating that the user is agitated. Only the mobile device 411 has an active session through the network. Thus, updated IRSCU is sent to the TE controller 420 from each communication device 411, 412, 413 to convey that the user is agitated. The TE controller 420 receives the updated IRSCU from each communication device 411, 412, 413. The TE controller 420 receives an IRSCU indicative of the user being upset about the data files not downloading quickly enough. The TE controller 420 allocates an increased bandwidth for the transfer of the data files. The data files are downloaded more quickly thereby appeasing the user and avoiding the QoE from suffering any further. This is an example of a prompt reaction to a problem impacting the user.

The foregoing scenario demonstrates how different traffic flows may be assigned different bandwidth allocations depending on a sensed characteristic of the user. In some implementations, traffic policies allow the user's QoE to be taken into account when implementing bandwidth allocation, instead of relying on network statistics or periodic surveys for example. In doing so, the TE controller 420 receives and analyzes IRSCU and takes this information into account to apply and adjust traffic policies to increase or manage overall QoE for the user.

There are many possible traffic policies that the TE controller 420 may implement. Some traffic policies have been described in the foregoing case scenario (e.g. decrease bandwidth for video content when the user may not actually be watching the video content). As another example, if the user is playing a video game on the PC 413 that involves streaming online game data, and the user is stressed, then bandwidth could be increased for the streaming of the online game data. Other traffic policies are possible and are within the scope of the invention.

In the illustrated embodiment, messages containing the IRSCU are received at the TE controller 420 from the communication devices 411, 412, 413. However, in another embodiment, the messages are sent to a database (not shown) that is accessible by the TE controller 420 for use in traffic management.

Figure 5:
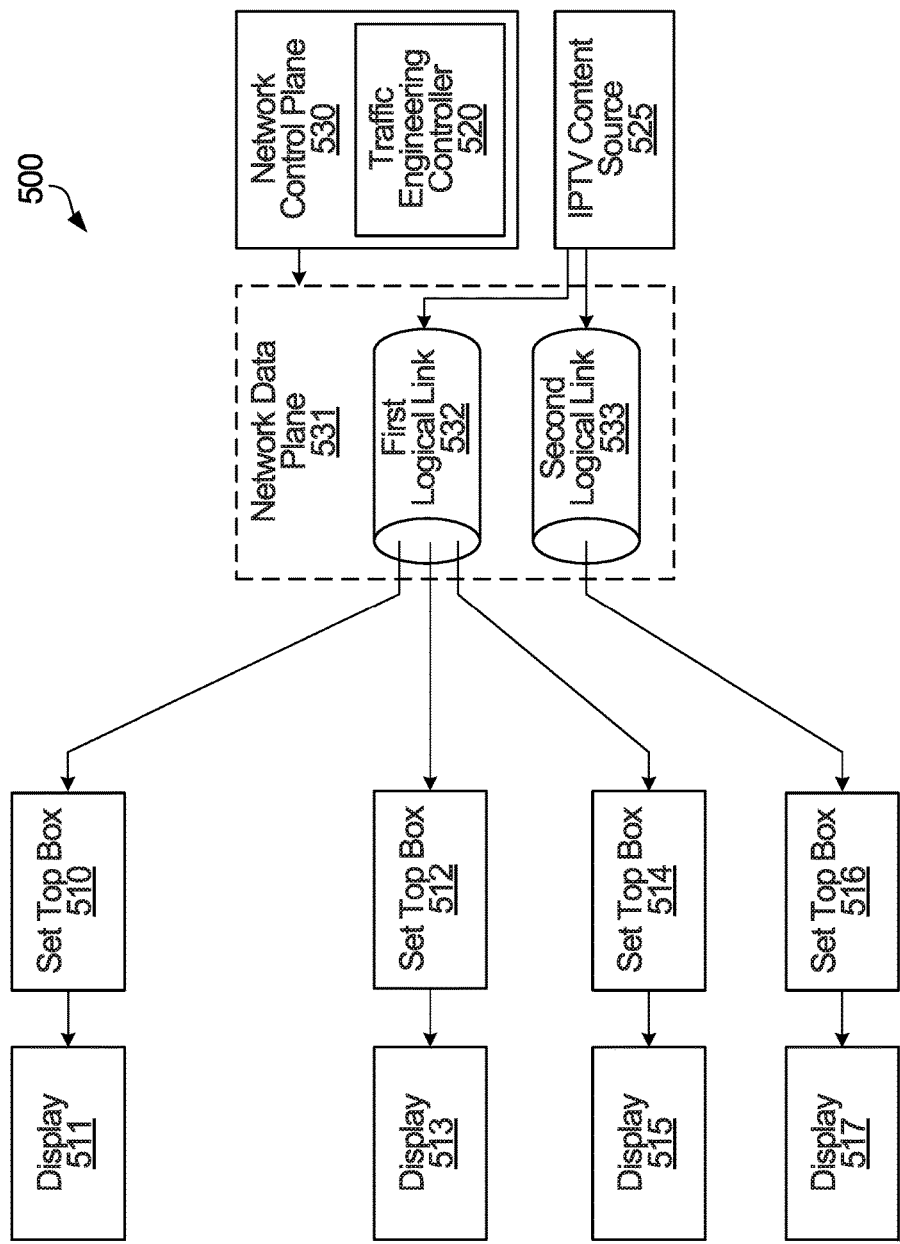
FIG. 5 is a block diagram of an example communication system having multiple communication devices for separate users, in accordance with an embodiment of the invention.

FIG. 5 is a block diagram of an example communication system 500 having multiple communication devices 510, 512, 514, 516 for separate users, in accordance with an embodiment of the invention. It is to be understood that the communication system 500 is shown with specific components in a specific arrangement for exemplary purposes only. Other components and arrangements are possible and are within the scope of the invention.

The communication devices 510, 512, 514, 516 include four set top boxes 510, 512, 514, 516, each having a corresponding display 511, 513, 515, 517. There may be other set top boxes and/or other communication devices, but they are not shown for sake of simplicity. In some implementations, each set top box 510, 512, 514, 516 has a configuration similar to the communication device 110 shown in FIG. 1. However, other configurations are possible and are within the scope of the invention.

The communication system 500 also has a network including a network control plane 530, which has a TE controller 520, and a network data plane 531 which provides data paths using logical links 532, 533 between the set top boxes 510, 512, 514, 516 and an IPTV (Internet Protocol Television) content source 525. In some implementations, the network is based on an optical network connecting a neighbourhood through optical connections. These optical connections can be aggregated using technologies such as Link Aggregation to provide logical clinks such as First Logical link 532 and second logical link 533. In some implementations, the network is an SDN network that employs ONF OpenFlow to provide access to the network data plane 531. However, other networks are possible and are within the scope of the invention, including networks in which the final connection between the network data plane 531 and the user side device (e.g. the set top box 510, or a mobile device) makes use of a wireless connection. In some implementations, the TE controller 520 has a configuration similar to the network management entity 120 shown in FIG. 1. In some implementations, the TE controller 520 forms part of a switch, a router, an optical cross-connect switch, a ROADM, or converged packet-optical equipment. Other TE controllers are possible and are within the scope of the invention.

Operation of the communication system 500 will now be described by way of example. In the illustrated example, each set top box 510, 512, 514, 516 receives streaming video from the IPTV content source 525. Each display 511, 513, 515, 517 displays the streaming video. In this example, three set top boxes 510, 512, 514 receive late night news for three users (i.e. one user per set top box), while the remaining set top box 516 receives an exciting action movie for one user. In some implementations, an IGMP (Internet Group Management Protocol) is used to establish the three set top boxes 510, 512, 514 as group members to receive the late night news in a multicast manner.

Each set top box 510, 512, 514 receiving the late night news receives sensor data pertaining to a sensed characteristic of the user from a corresponding peripheral sensor (not shown), and sends, to the TE controller 520, a message containing IRSCU. Of the three users receiving the late night news, only one of them is actively watching the late night news while the remaining two users are falling asleep. This is reflected in the IRSCU sent to the TE controller 520.

The set top box 516 receiving the exciting action movie receives sensor data pertaining to a sensed characteristic of the user from a corresponding peripheral sensor (not shown), and sends, to the TE controller 520, a message containing IRSCU. The user receiving the exciting action movie is actively watching the exciting action movie. This attentiveness is reflected in the IRSCU sent to the TE controller 520.

The TE controller 520 receives the four messages (i.e. one message from each of the set top box 510, 512, 514, 516). The TE controller 520 adjusts, based on the IRSCU conveyed by the set top boxes 510, 512, 514, 516, bandwidth allocations for the traffic flows to the users.

Given that most of the users receiving the late night news are falling asleep, the TE controller 520 reduces bandwidth allocation for the first logical link 532. In some implementations, this is accomplished by rate control of the first logical link 532 to reduce bandwidth used for the late night news. In some implementations, a TOP flow adapts to the reduced bandwidth provided by the first logical link 532, and the IPTV content source 525 accordingly reduces a video bit rate for the late night news while maintaining the same audio bit rate. In other implementations, the first logical link 532 is a logical link created as a LAG (Link Aggregation Group). By modifying the links comprising the LAG used to create link 532, the bandwidth can be decreased (or increased) as required.

The users that are not actively watching the late night news may not notice that video quality has decreased due to the reduced video bit rate, so this does not harm QoE for those users. Meanwhile, bandwidth is saved. In essence, a bandwidth allocation is determined for several users based on an aggregate combination of IRSCU.

Given that the user associated with the set top box 516 is actively watching the movie, the TE controller 520 can maintain or even increase the bandwidth allocation for the second logical link 533. In some implementations, this is accomplished by rate control of the second logical pipe 533 to increase bandwidth for the exciting action movie. In some implementations, a TCP flow adapts to the increased bandwidth provided by the second logical link 533, and the IPTV content source 525 accordingly increases a video bit rate for the exciting action movie while maintaining the same audio bit rate.

The user may notice that video quality has increased due to the video bit rate being increased. This may improve the perceived QoE. In essence, some of the bandwidth savings from reducing the video bit rate for the late night news is spent on increasing the video bit rate for the movie. This allows the network operator to improve the overall QoE of the users by reallocating resources.

In some implementations, as in the illustrated example, the users are categorized based on the content that they are receiving. In particular, the users that receive the late night news are categorized in a first group that receives the late night news through the first logical link 532, and the user that receives the exciting action movie is categorized in a second group that receives the exciting action movie through the second logical link 533. Traffic allocation is applied on a per-group basis.

In other implementations, the users are categorized according to the IRSCU that is received at the TE controller 520. For example, the users that are actively engaged can be categorized in a first group, which receives content through a first logical link, and the users that are falling asleep can be categorized in a second group, which receives content through a second logical link. The categorisation is performed regardless of what content the users are watching. Again, bandwidth allocation is applied on a per-group basis. For example, the TE controller 520 can implement a bandwidth allocation that includes a high bandwidth for the traffic flows through the first logical link, and implement a bandwidth allocation that includes a low bandwidth for the traffic flows through the second logical link.

There are many ways in which the users can be categorized. In general, for each user, the TE controller 520 assigns each user to a group of users, and can then control aggregate bandwidth allocation for the group of users. In some implementations, the categorisation is based on the content being received, and/or the IRSCU that is received at the TE controller 520, and/or some other criteria.

In the illustrated embodiment, messages containing the IRSCU are received at the TE controller 520 from the set top boxes 510, 512, 514, 516. However, in another embodiment, the messages are sent to a database (not shown) that is accessible by the TE controller 520 for use in traffic management. In some implementations, the database stores the IRSCU for the users of the communication system 500. In some implementations, the database provides anonymized data to the TE controller 520 based on geographic pools. As a specific example, the database conveys that in a given neighbourhood that the IRSCU indicates, that 50% of the users are falling asleep, without specifically identifying any of the users. In particular, as noted above, two out of the four users are falling asleep while receiving the late night news. However, there is no need to identify which users are falling asleep. Thus, in some implementations, the invention enables sharing of anonymized information while offering some privacy for the users.

Although the communication system 500 described above with reference to FIG. 5 generally focuses on communication devices 510, 512, 514, 516 receiving multimedia content, embodiments of the invention are applicable to receiving and/or sending data for other purposes. For example, in some implementations for the medical field, a communication system includes a pacemaker and a heart monitor for a user. The heart monitor monitors the user's heart and conveys IRSCU to a TE controller of a wireless network. In the event that the user is experiencing a heart attack, this may be picked up by the heart monitor, and the IRSCU sent to the TE controller informs the TE controller that the user is having a heart attack. In response, the TE controller can ensure a sufficient bandwidth allocation to and from the pacemaker and any other medical devices associated with the user. Thus, bidirectional communication with medical devices, such as the pacemaker, is prioritized over other communications in the wireless network. This may allow medical practitioners to promptly obtain data and control the pacemaker as appropriate for diagnostic and/or treatment purposes.

Additional Methods

Figure 6:
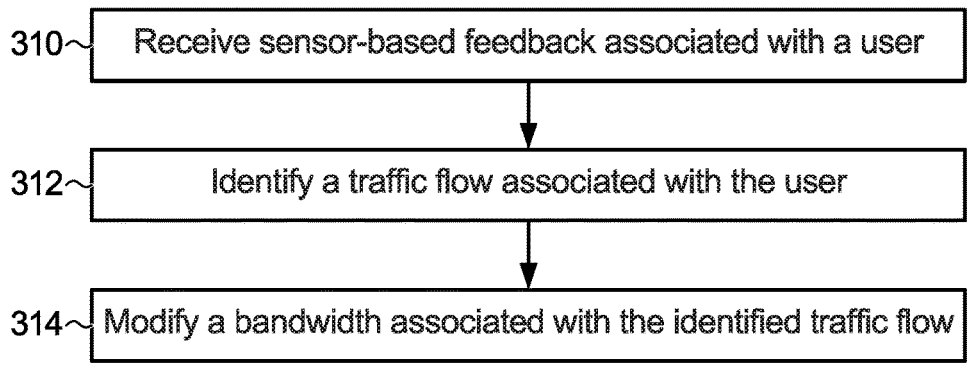
FIG. 6 is a flowchart of another method for adjusting a bandwidth allocation for a traffic flow associated with a user as a function of a sensed characteristic of the user, in accordance with an embodiment of the invention.

FIG. 6 is a flowchart illustrating an exemplary method for execution at a network management entity, such as a TE controller. In step 310, sensor based feedback associated with a user is received. This feedback data may be received from a communication device associated with a user, or it may be received from a database storing user feedback data. Feedback data received via a database may be received in response to a request sent by the management entity, or it may be sent by the database in response to detection of a triggering condition. To act upon the retrieved feedback data, the network management entity identifies a traffic flow associated with the user in step 312. If no traffic flows are associated with the user, then there are no actions for the network management entity to take. Where a plurality of flows is identified, the network management entity may take different actions on each flow, or it may elect to act on all flows at the same time. Depending on the nature of the sensor based feedback, only one flow may be identified. In step 314, the bandwidth allocated to the identified flow is modified. When the network management entity is a TE controller, the TE controller can adjust the allocated bandwidth across the network to ensure that the flow is provided the desired resources.

When the traffic flow has a source that monitors link conditions (which may be done using any of number of techniques including back-pressure analysis), by reducing the bandwidth allocated to a flow, the traffic source will reduce the flow rate accordingly. Increases in bandwidth allocation may take longer to result in an increased traffic flow rate. As noted above, when using information such as information from heart rate sensors, which may be paired with other information, such as location information, a network management entity may select a video stream being transmitted to a display in step 312 and based on the information received in step 310, determine that the user has fallen asleep and the flow rare can be reduced.

In another example, when the information received in step 310 indicates that the user is stressed (e.g. any of higher pulse rate, different blood oximetry readings, changes in skin temperature readings, changes in electrical conductivity of the skin, etc.) and a location reading indicates that the user is at an airport, a traffic flow used to download documents to the user's laptop can be selected. The network management entity can increase the bandwidth allocation in step 314 for the download to allow the download to proceed at a faster pace. As noted above, increasing the bandwidth allocation may require other conditions to be met, including a determination that there is sufficient bandwidth available to allow for the increase.

Figure 7:
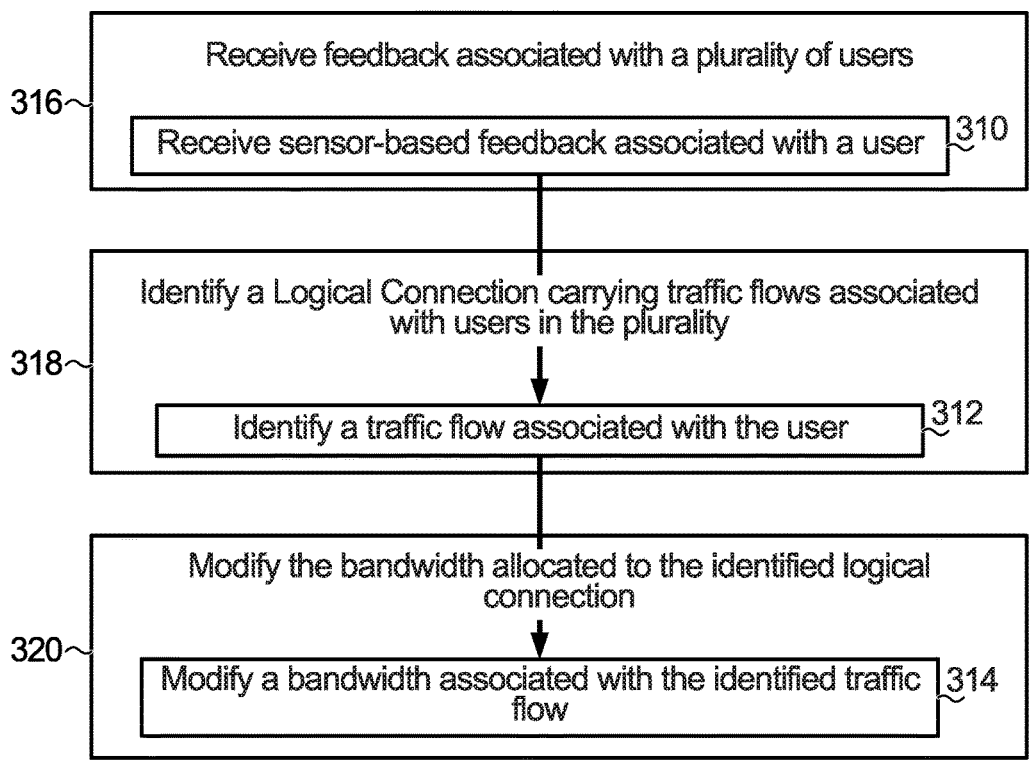
FIG. 7 is a flowchart illustrating an embodiment of the method of FIG. 6 in which a user and a traffic flow are treated as part of an aggregate group.

FIG. 7 illustrates an embodiment of the method of FIG. 6, in which the user and the traffic flow associated with the user are treated as part of an aggregate group. Step 310, as described above, takes place as part of step 316 in which feedback data associated with a plurality of users is obtained. The rules used to group the users together into a plurality may include an identification of a common type of traffic flow, a relationship based on the location of the users (either with respect to geographic location or with respect to the location of the users with respect to the topology of the network), a common device or connection type, or other factors that will be apparent to those skilled in the art. Step 312, as described above, takes place as part of step 318 in which a logical connection carrying traffic flows associated with the plurality of users is identified. As an example, if a plurality of users is identified in step 316, and the users are all receiving video streams (regardless of the source) over identifiable traffic flows, the group of traffic flows can be aggregated into a common logical connection. This logical connection is then identified in step 318 (it should be noted that this aggregation may have already occurred outside of the method being discussed). In some embodiments, this logical connection is set up as a LAG. The use of a LAG as a logical connection is well known in the art.

In step 318, the bandwidth allocated to the logical connection is modified. In the example discussed above with respect to an IPTV connection over an LAG link, a network management entity can send an LACP (Link Aggregation Control Protocol) message to nodes in the LAG group to reduce the number of physical connections in the LAG. This has the effect of reducing the overall bandwidth allocated to the LAG, which may result in congestion. This congestion will result in dropped packets in the video streams which will cause a reduction in the quality of the video links carried by the LAG. The video sources will adjust their source rates, and the amount of bandwidth consumed will converge on the capacity of the LAG. In other embodiments, where feedback data indicates that it may be beneficial, the decision to modify the bandwidth allocation of the LAG can result in an LACP message that increases the number of ports (with their corresponding links) allocated to the LAG. This will allow any attempt to send higher quality streams through the LAG to be accepted. Over a short time interval, adaptive rate transmission methods used by the traffic sources will cause the overall data rate in the LAG to converge on the new (and expanded) LAG capacity. In another embodiment, the logical connection may be a part of a network slice, and a traffic engineering management entity or an SDT (Software Defined Topology) management entity can adjust the bandwidth allocation to the logical connection to either increase or decrease the bandwidth allocation. In such a virtualized environment, the use of an SDT management entity to adjust bandwidth allocations is well known. It should be noted that in a virtualized environment, it may be possible for the bandwidth to be adjusted with a related modification to a connection latency. The adjustment to latency can be performed separately from the adjustment to the bandwidth. In some environments, such as delivering an IPTV stream, latency is not a great concern, but in other environments, such as real time video conferencing, or real-time control situations, modification of the latency associated with a connection can result in an increase in the QoE quite independently of the bandwidth allocation. The same methods used to determine an adjustment in the bandwidth allocation can be employed to adjust a latency associated with the connection.

Figure 8:
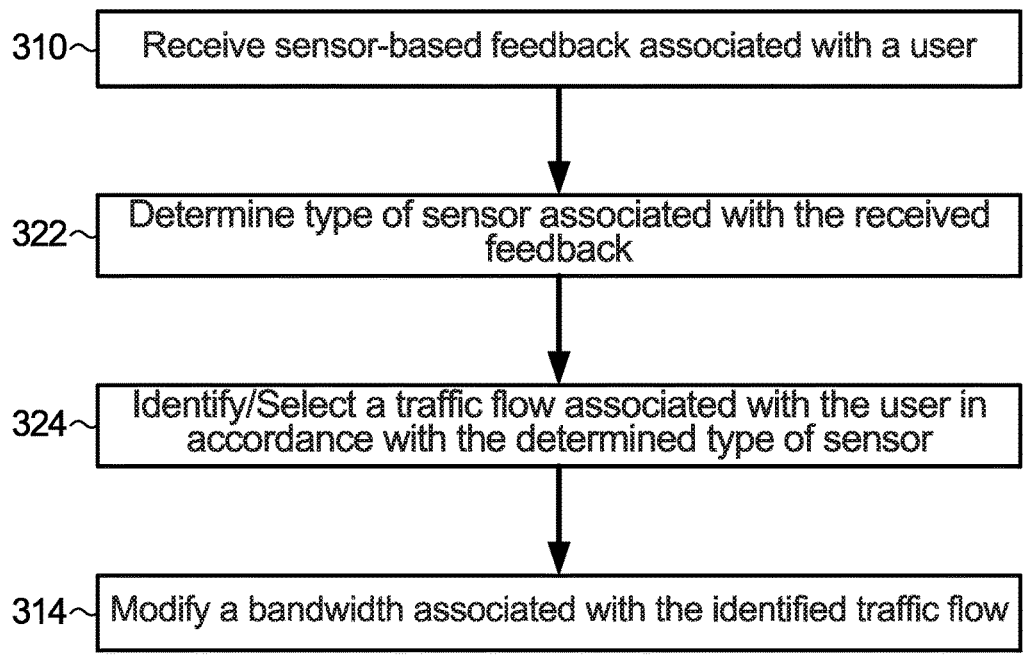
FIG. 8 is a flowchart of a method for adjusting a bandwidth allocation for a traffic flow associated with a user as a function of a type of sensor that provides feedback, in accordance with an embodiment of the invention.

Those skilled in the art will appreciate that the adjustments to the bandwidth allocations are not necessarily tied to connections associated with the device that provides the sensor-based feedback. Additionally, the type of sensor that provides the feedback may be a factor in the decision process. FIG. 8 is a flow chart illustrating such a method.

As indicated in FIG. 6, in step 310, sensor based feedback associated with the user is received. In step 322 the type of the sensor providing feedback is determined. There are many different types of sensors that have been discussed above, but even within the broad classes of sensors there are differences. A heartrate sensor that is part of a watch may indicate an elevated heart rate, but the same reading coming from a pacemaker or other dedicated piece of medical equipment may be treated differently by a network management entity. As illustrated, in step 324, the determined type of sensor is used to select or identify a traffic flow of interest that is associated with the user. In step 314, the bandwidth allocated to the traffic flow identified in step 324 is increased.

In a tele-health scenario, a user may be connected to a number of different sensors and devices. The sensors are used to monitor patient vital signs so that a medical professional (or team of professionals) can take care of the patient's needs from afar. In some situations, it may not be feasible to have a guaranteed QoS on the connection to a tele-health station that will accommodate a large number of people. Instead, the connectivity resources can be focussed on the patients that require more attention. If a sensor reading from a medical heart rate monitor and a blood oximeter are received by a network management entity and indicate that the patient is in distress, based on the type of sensors providing the feedback, the network management entity can increase the bandwidth allocated to other devices and/or sensors associated with the user. This will allow a remote team of medical professionals to instruct medical devices (e.g. a pacemaker or a medical drug delivery system) to address an issue associated with the distress. By increasing the bandwidth associated with the traffic flows to and from the devices and/or the sensors associated with the patient, lower latency access to medical devices can be obtained and more frequent sensor readings can be recorded. As the underlying condition causing the symptoms reported by the initial sensor-based feedback are addressed, the reading that caused the increase in bandwidth will change. This can result in a change in the bandwidth allocations so that sufficient bandwidth can be allocated to the next emergency.

Numerous modifications and variations of the present invention are possible in light of the above teachings. It is therefore to be understood that within the scope of the appended claims, the invention may be practised otherwise than as specifically described herein.

I claim:

1. A method for execution by a communication device, the method comprising:
   receiving sensor data pertaining to a sensed characteristic of a user; and
   sending, to a network management entity used for adjusting a bandwidth allocated to a logical link used for carrying a traffic flow associated with the user, a message containing IRSCU (information representative of the sensed characteristic of the user), wherein the user is categorized into a group of users associated with a plurality of traffic flows carried by the logical link, wherein adjusting the bandwidth comprises adjusting an aggregate bandwidth for the plurality of traffic flows, and wherein the network management entity is different from a source of the traffic flow associated with the user.

2. The method of claim 1, wherein sending the message to the network management entity comprises sending the message to a database that is accessible by the network management entity.

3. The method of claim 1, further comprising:
generating the message such that the message comprises a header with information for use in routing the message to the network management entity.

4. The method of claim 1, wherein receiving sensor data comprises receiving at least one of brainwave data of the user, user heartrate data, body temperature data of the user, respiratory rate data of the user, muscle tension data of the user, skin temperature data of the user, skin electrical conductivity data of the user, blood oximetry data of the user, or blood pressure data of the user.

5. The method of claim 1, wherein the IRSCU comprises at least some of the sensor data.

6. The method of claim 1, further comprising:
determining a state of the user based on the sensor data;
wherein the IRSCU comprises an indication of the state of the user.

7. The method of claim 6, further comprising:
determining whether there has been a change in the state of the user; and
if there has been a change in the state of the user, sending an update message containing the IRSCU.

8. A communication device comprising:
a network interface configured to communicate with a network;
a sensor data receiver for receiving sensor data pertaining to a sensed characteristic of a user; and
circuitry implementing an IRSCU (information representative of the sensed characteristic of the user) messenger configured for sending, from the network interface to a network management entity used for adjusting a bandwidth allocated to a logical link used for carrying a traffic flow associated with the user, a message containing IRSCU, wherein the user is categorized into a group of users associated with a plurality of traffic flows carried by the logical link, wherein adjusting the bandwidth comprises adjusting an aggregate bandwidth for the plurality of traffic flows, and wherein the network management entity is different from a source of the traffic flow associated with the user.

9. The communication device of claim 8, wherein:
the circuitry implementing the IRSCU messenger comprises a processor; and
the communication device further comprises a computer-readable medium having recorded thereon instructions that when executed by the processor configure the processor to implement the IRSCU messenger.

10. A method for execution by a network management entity, the method comprising:
receiving a message containing IRSCU (information representative of a sensed characteristic of a user);
adjusting, based on the IRSCU, a bandwidth allocated to a logical link used for carrying a traffic flow associated with the user, wherein the user is categorized into a group of users associated with a plurality of traffic flows carried by the logical link, wherein adjusting the bandwidth comprises adjusting an aggregate bandwidth for the plurality of traffic flows, and wherein the network management entity is different from a source of the traffic flow associated with the user.

11. The method of claim 10, wherein receiving the message comprises:
receiving the message from a communication device.

12. The method of claim 11, wherein adjusting the bandwidth comprises adjusting bandwidth for the communication device.

13. The method of claim 11, wherein:
the communication device is a first communication device of a plurality of communication devices for the user and the message containing the IRSCU is a first message containing the IRSCU;
the method further comprises receiving a second message containing the IRSCU from a second communication device of the plurality of communication devices; and
adjusting the bandwidth comprises adjusting bandwidth for the second communication device of the plurality of communication devices based on the first message and the second message.

14. The method of claim 10, wherein:
receiving the message comprises receiving the message from a database that is accessible by the network management entity; and
adjusting the bandwidth comprises adjusting bandwidth for at least one communication device of the user.

15. The method of claim 10, wherein the IRSCU comprises sensor data of the user.

16. The method of claim 15, wherein the sensor data comprises at least one of brainwave data of the user, user heartrate data, body temperature data of the user, respiratory rate data of the user, muscle tension data of the user, skin temperature data of the user, skin electrical conductivity data of the user, blood oximetry data of the user, or blood pressure data of the user.

17. The method of claim 10, wherein the IRSCU comprises an indication of a state of the user.

18. The method of claim 10, wherein adjusting the bandwidth comprises:
increasing the bandwidth if the IRSCU is construed as suggesting that the user is frustrated or in distress; and
decreasing the bandwidth if the IRSCU is construed as suggesting that the user is asleep or not alert.

19. The method of claim 10, further comprising:
maintaining user-specific information of the user;
wherein adjusting the bandwidth is further based on the user-specific information of the user.

20. The method of claim 10, wherein adjusting the bandwidth comprises:
determining a type of sensor from which the IRSCU is based; and
identifying, based on the type of sensor, a traffic flow of interest that is associated with the user; and
adjusting the bandwidth for carrying the traffic flow of interest.

21. A network management entity comprising:
an interface configured to receive a message containing IRSCU (information representative of a sensed characteristic of a user); and
circuitry implementing a bandwidth adjustor configured for adjusting, based on the IRSCU, a bandwidth allocated to a logical link used for carrying a traffic flow associated with the user,
wherein the user is categorized into a group of users associated with a plurality of traffic flows carried by the logical link, wherein adjusting the bandwidth comprises adjusting an aggregate bandwidth for the plurality of traffic flows, and wherein the network management entity is different from a source of the traffic flow associated with the user.

22. The network management entity of claim 21, wherein:
- the circuitry implementing the bandwidth adjustor comprises a processor; and
- the network management entity further comprises a computer-readable medium having recorded thereon instructions that when executed by the processor configure the processor to implement the bandwidth adjustor.

23. The network management entity of claim 21, wherein the network management entity is a TE (Traffic Engineering) controller.

* * * * *